3,417,085
3,1-BENZOTHIAZINES AND 3,1-BENZOXAZINES
Heinz Kuch and Günther Seidl, Frankfurt am Main, and Irmgard Hoffmann, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed May 24, 1966, Ser. No. 552,416
Claims priority, application Germany, June 3, 1965, F 46,229; Mar. 18, 1966, F 48,687; Mar. 22, 1966, F 48,726; Mar. 23, 1966, F 48,738; Mar. 23, 1966, F 48,739
14 Claims. (Cl. 260—243)

ABSTRACT OF THE DISCLOSURE 3,1-benzothiazines and 3,1-benzoxazines substituted in the 4-position by lower alkyl, benzyl, unsubstituted aryl of 6 to 10 carbon atoms, or phenyl substituted by halogen, methoxy, trifluoromethyl or nitro, and acid addition salts thereof. The products of the invention have valuable pharmacological properties, in particular, centrally depressive action.

---

The present invention provides heterocyclic compounds and a process for preparing them; more particularly, the present invention provides new derivatives of 3,1-benzothiazine and 3,1-benzoxazine which have valuable pharmacological properties and which correspond to the general Formula I

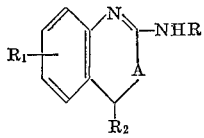

I in which A is oxygen or sulfur; R is hydrogen, alkyl of 1 to 6 carbon atoms, cyclohexyl, lower alkenyl, cycloalkenyl of five to six carbon atoms, phenyl, benzyl, di-lower alkylamino-lower alkyl, piperidino-lower alkylene, morpholino-lower alkylene, pyrrolidino-lower alkylene, N-lower alkyl-piperazino-lower alkylene or N-benzylpiperazino-lower alkylene; $R_1$ is hydrogen, halogen, methoxy, trifluoromethyl or nitro; $R_2$ is lower alkyl, benzyl, unsubstituted aryl of 6 to 10 carbon atoms, or phenyl substituted by halogen, methoxy, trifluormethyl or nitro, or acid addition salts of said compounds with a physiologically compatible organic or inorganic acid.

The compounds of the present invention and their salts with inorganic and organic acids can be obtained by (a) Reacting, if necessary with the addition of acids and/or water-separating agents, compounds of the general Formula II

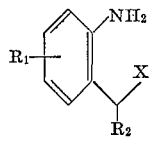

II in which $R_1$ and $R_2$ have the meanings given above and X represents a chlorine or bromine atom, a hydroxyl, sulfhydryl, alkoxy, alkylthio or alkanoyloxy group, with thioureas of the general Formula IIIa

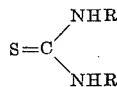

IIIa in which R has the meaning given above and the two radicals R may be identical or different, or with isothiocyanates of the general Formula IIIb $$S=C=N-R \qquad \text{IIIb}$$

in which R has the meaning given above, or with compounds which form such isothiocyanates, or by reacting compounds of the Formula II in which X represents a chlorine or bromine atom, a hydroxyl, alkoxy or alkanoyloxy group, with isocyanates of the general Formula IIIc $$O=C=N-R \qquad \text{IIIc}$$

in which R has the meaning given above, or with compounds which form such isocyanates, if necessary with the addition of acids and/or water-separating agents, or (b) Treating, if necessary with simultaneous or subsequent acid treatment, compounds of the general Formula IV

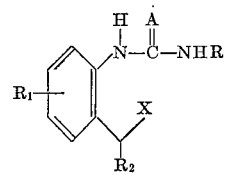

IV in which A, X, R, $R_1$, and $R_2$ have the meanings given above, or corresponding functional derivatives of these ureas or thioureas, with hydrogen sulfide, inorganic sulfides or water-separating agents if A represents an oxygen atom, or reacting said compounds with agents splitting-off sulfur if A represents a sulfur atom, or (c) Reacting compounds of the general Formula V

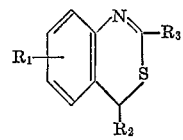

V in which $R_1$ and $R_2$ have the meanings given above and $R_3$ represents a chlorine or bromine atom, an amino, sulfhydryl or S-alkyl group, with amines of the general Formula VI or with salts of these amines $$R'-NH_2 \qquad \text{VI}$$

in which R' has the meaning of R with the exclusion of hydrogen, or (d) Reacting a compound of the general Formula V in which $R_1$ and $R_2$ have the meanings given above and $R_3$ represents the amino group, with a reactive derivative of an alcohol of the general Formula VII $$R'OH \qquad \text{VII}$$

in which R' has the meaning given above, or (e) Reducing with complex metal hydrides compounds of the general Formula VIII

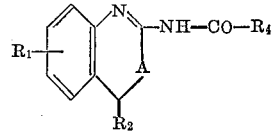

VIII in which A, $R_1$, and $R_2$ have the meanings given above and $R_4$ represents alkyl, alkenyl, aryl, aralkyl, halogenoalkyl or dialkylaminoalkyl wherein the alkyl groups of the dialkylaminoalkyl radical each contain up to 4 carbon atoms and wherein the dialkylamino group may form a ring which, if desired, may be closed through an oxygen or sulfur atom or a methyl-imino or benzyl-imino group, and, if $R_4$ represents a halogenoalkyl radical, reacting compound VIII prior to or after the reduction of the acyl group with dialkylamines which correspond to the meaning of R and may also be closed to a ring, or (f) Reacting compounds of the general Formula II, in which X represents a chlorine or bromine atom, a hydroxyl, alkoxy or alkanoyloxy group, and $R_1$ and $R_2$ have the meanings given above, with halogen cyanides of the general Formula IX $$Y\!-\!C\!\equiv\!N \qquad\qquad IX$$

in which Y represents a chlorine, bromine or iodine atom, if necessary, with subsequent acid treatment, or (g) Reacting compounds of the general Formula I in which A represents an oxygen atom and R, $R_1$, and $R_2$ have the meanings given above, with hydrogen sulfide or inorganic sulfides, and, in order to obtain the salts of the basic compounds thus obtained, converting these into their acid addition salts by treatment with inorganic or organic acids.

For the reaction according to (a), there may be used as starting substances of the general Formula II, for example, 2-amino-benzhydrols. Of these, there are mentioned: 2-amino-benzhydrol, 2-amino-fluorobenzohydrols, 2-amino-chlorobenzohydrols, in particular 2-amino-5-chlorobenzohydrol, 2-amino-bromobenzohydrols, 2-amino-methoxybenzohydrols, 2-amino-trifluoromethyl-benzohydrols, 2-amino-nitrobenzohydrols, in particular 2-amino-5-nitrobenzohydrol, 2 - amino-methoxy-chlorobenzohydrols, 2-amino-nitrobromobenzohydrols, 2-amino-trifluoromethyl-nitrobenzohydrols, 2 - amino-trifluoromethylchlorobenzohydrols, wherein the substituents indicated after "2-amino-" may be in 3-, 4-, 5- or 6-position of one and/or in 2'-, 3'-, or 4'-position of the other benzene ring; furthermore, 2-amino-chloro-dimethoxy-benzohydrols, 2-amino-nitro-chlorofluorobenzohydrols or 2-amino-methoxy-dichlorobenzohydrols, wherein the substituents indicated after "2-amino-" may stand in the following positions: one of them in 3-, 4-, 5- or 6-position of the benzene ring carrying the amino group and two of them in 2'-, 3'-, 4'-, 5'- or 6'-position of the other benzene ring. Furthermore, there may be used the lower O-alkyl ethers which correspond to the above-mentioned benzohydrols, for example, 2-amino-benzohydryl-methyl ether, 2-aminobenzohydryl-ethyl ether, or the corresponding esters with low molecular weight aliphatic carboxylic acids, for example, the acetates or propionates of the afore-mentioned benzohydrols. The corresponding halides such as 2-aminophenyl-phenyl-chloro- (or bromo-) methane and the compounds which are correspondingly substituted in the phenyl radicals, for the preparation of benzothiazine also the corresponding mercaptanes and lower alkyl-thioethers such as 2-amino-phenyl- phenylmethylmercaptane or the corresponding lower alkyl thioethers may also be used.

Furthermore, there may be used as starting substances of the general Formula II α-alkyl-2-aminobenzyl alcohols, α-naphthyl-2-aminobenzyl alcohols and α-aralkyl-2-aminobenzyl alcohols. Of these there are mentioned: α-methyl-2-aminobenzyl alcohol, α-methyl-2-amino-fluorobenzyl alcohols, α-methyl-2-aminochlorobenzyl alcohols, α-methyl-2-amino-bromobenzyl alcohols, α-methyl - 2 - amino-methoxy-benzyl alcohols, α-methyl-2-amino-trifluoromethyl-benzyl alcohols, α-methyl-2-amino-nitrobenzyl alcohols, α-ethyl-2-aminobenzyl alcohol, α-ethyl-2-aminochlorobenzyl alcohols, α-ethyl-2-aminomethoxy-benzyl alcohols, α-ethyl-2-amino-trifluoromethyl-benzyl-alcohols, α-ethyl-2-amino-nitrobenzyl alcohols, α-propyl-2-aminobenzyl alcohol, α-propyl-2-amino-chlorobenzyl alcohols, α-propyl-2-amino-nitrobenzyl alcohols, α-isopropyl-2-aminobenzyl alcohol, α-isopropyl-2-aminobromobenzyl alcohols, α-isopropyl-2-amino-methoxybenzyl alcohols, α-butyl-2-aminobenzyl alcohols, α-butyl-2-amino-chlorobenzyl alcohols, α-isobutyl-2-aminobenzyl alcohol, α-isobutyl-2-aminochlorobenzyl alcohols, α-naphthyl-2-aminobenzyl alcohol, α-benzyl-2-aminobenzyl alcohol, α-benzyl-2-amino-chlorobenzyl alcohols, α-benzyl-2-amino-methoxybenzyl alcohols, in which the substituents indicated after "2-amino-" may stand in 3-, 4-, 5- or 6-position of the benzene ring.

Furthermore, there may be used the low molecular weight O-alkyl ethers which correspond to the above-mentioned benzyl-alcohols or the corresponding esters with lower aliphatic carboxylic acids, for example, the acetates or propionates of the mentioned benzyl alcohols.

The corresponding halides such as methyl-2-aminophenylchloro- (or -bromo-) methane or the compounds which are correspondingly substituted in the phenyl radical, for the preparation of benzothiazines also the corresponding mercaptanes and low molecular weight alkyl thioethers such as α-methyl-2-amino-benzyl-mercaptan, or the corresponding low molecular weight alkyl thioethers may likewise be used.

The salts derived from the said basic compounds with strong acids such as hydrohalic acids, sulfuric acid as well as benzene- and toluene-sulfonic acid are likewise suitable as starting substances.

As starting substances of the general Formula IIIa, there may be used thiourea and the N-mono- or N,N'-di-substituted derivatives thereof such as N-methyl-, N-ethyl-, N-propyl-, N-isopropyl-, N-butyl-, N-isobutyl-, N-hexyl-, N-cyclohexyl-, N-allyl-, N-cyclohexenyl-, N-phenyl-, N-benzyl-, N-diethyl-aminoethyl-, N-dimethyl-aminopropyl-, N,N'-dimethyl-, N,N'-diethyl-thiourea, whereas as starting substances of the general Formula IIIb, there may be used isothioisocyanates such as methyl-, ethyl-, propyl-, isopropyl-, butyl-, isobutyl-, hexyl-, cyclohexy-, allyl-, cyclopentyl-, phenyl-, benzyl-, dimethyl-aminoethyl-, piperidinoethyl-, morpholinoethyl-, N-methyl-piperazinoethyl-, diethylaminopropyl-, pyrrolidinopropyl-, thiamorpholinopropyl-, N-benzyl-piperazinopropyl-isothiocyanate. Furthermore, there may also be used instead of isothiocyanates substances which form isothiocyanates as well as the corresponding thiourethanes or dithiocarbamic acid esters.

As starting substances of the general Formula IIIc there may be used isocyanic acid and isocyanates such as methyl-, ethyl-, propyl-, isopropyl-, butyl-, isobutyl-, hexyl-, cyclohexyl-, allyl-, cyclohexenyl-, phenyl-, benzyl-, dimethylaminopropyl-isocyanate; furthermore, there may be used substances which form such isocyanates (cf. Houben Weyl, "Methoden der organischen Chemie," 4th edition, volume 8, pages 119–127) and the corresponding carbamic acid chlorides and urethanes.

The reaction of the compounds of the general Formula II as well as of their acid addition salts with thioureas of the general Formula IIIa according to (a) is carried out at temperatures in the range of 20 to 250° C., preferably 80 to 180° C.

The reaction is carried out in the presence of inorganic or organic acid, for example hydrohalic acids such as hydrochloric acid, hydrobromic acid and hydroiodic acid, furthermore sulfuric acid, phosphoric acid, lower aliphatic carboxylic acids such as formic acid and acetic acid, halogeno-carboxylic acids such as chloroacetic acid, trifluoroacetic acid or benzene- and toluenesulfonic acid, or mixtures thereof. The reaction may also be carried out, if necessary, in the presence of water-separating agents, for example, inorganic acid halides and acid anhydrides such as phosphorus trichloride, phosphorus tribromide, phosphorus pentachloride, thionyl chloride or phosphorus pentoxide, and zinc chloride or boron fluoride.

The isothio-uronium salts which correspond to the general Formula II, in which X represents the radical

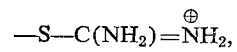

and which are formed in the reaction of compounds of the general Formula II with thioureas of the Formula IIIa are in general not isolated, since they easily pass over into the products of the invention under the reaction conditions.

The reaction of compounds of the general Formula II with the compounds of the general Formulae IIIb and IIIc is carried at temperatures in the range of 0 to 200° C., preferably 20–130° C. Intermediately formed urea or thiourea derivatives, which, if desired, can be isolated as intermediate products, are converted into the products of the invention by a subsequent treatment of the reaction mixture or of the isolated intermediate compounds with inorganic or organic acids or with agents splitting-off water; the use of elevated temperatures, depending on the speed of the reaction, may be of advantage.

As additional solvents or diluents, there may be used, if desired or if necessary, water, lower alcohols such as methanol, ethanol, isopropanol, ethers such as diethyl ether, tetrahydrofurane, dioxane, furthermore glycol, glycol monomethyl- and ethyl ether, di- and tri-ethylene glycol, as well as aromatic hydrocarbons such as benzene, toluene, xylene or chlorohydro-carbons such as chlorobenzene, chloroform, trichlorethylene or tetrachlorethane; the selection of the suitable solvent or diluent depends on the stability and reactivity of the reaction components used.

For the reaction of the benzohydryl halides of the general Formula II (X=Cl, Br) or of the acid addition salts thereof with the compounds of the general Formulae IIIa IIIb and IIIc, the presence of acids or agents splitting off water for the cyclization of the intermediately formed urea or thiourea derivatives is generally not required. These reactions are preferably carried out in the molten state or by heating in a suitable solvent.

The reaction times may be varied within wide limits according to the reactivity of the components and the temperature chosen. For working up, the reaction products of the general Formula I which in most cases are obtained in the form of salts may be isolated directly, if required after concentration of the solution, and, if desired, converted into the free bases by subsquent treatment with alkali. It is also possible to adjust the pH of the reaction mixture to an alkaline value prior to the isolation, whereby the reaction products can be isolated in the usual manner in the form of the free bases.

The starting substances of the general Formula IV, in which A represents an oxygen atom and which are required for the reaction according to (b), are obtained by reacting, for example, compounds of the general Formula II, in which X stands for a halogen atom, a hydroxyl, alkoxy, alkanoyloxy or alkylthio group, with isocyanates of the general formula R—N=C=O, in which R has the meaning given above.

Instead of compounds of the general Formula IV, the functional derivatives of these ureas, for example compounds which contain instead of the urea grouping the pre-stages thereof such as the carbodiimide group, the guanidino or the chloroformic acid amidine group, may also be used for the reaction according to (b) to obtain the products of the invention.

Whereas the treatment of the said compounds of the Formula IV with acids or dehydrating agents yields benzoxazines, the treatment with hydrogen sulfide or inorganic sulfides such as alkali metal sulfides or phosphorus penta-sulfide or the mixtures thereof leads to the corresponding benzothiazines. This reaction is carried out at temperatures in the range of 50 to 200° C., preferably 80 to 160° C., if necessary with the addition of acids and in the presence of an organic solvent, for example, an aromatic hydrocarbon such as benzene, toluene or xylene or an aliphatic or aromatic chlorohydrocarbon such as carbon tetrachloride, tetrachloroethane or chlorobenzene. Particularly advantageous, however, is the use of pyridine as the solvent. Depending on the boiling point of the solvent used and on the reaction temperature required, especially if hydrogen sulfide is used, the reaction is carried out under pressure, if necessary.

Ureas of the general Formula IV in which X stands for the sulfhydryl group may also be converted into the products of the invention by treatment with dehydrating agents such as inorganic acid halides and acid anhydrides.

The starting substances of the general Formula IV, in which A stands for a sulfur atom and which are required for the reaction according to (b), are obtained, for example, by reacting compounds of the general Formula II with isothiocyanates of the general formula R–N=C=S, in which R has the meaning given above. As such isothiocyanate, there may be used methyl-, ethyl-, propyl-, isopropyl, butyl-, isobutyl-, hexyl-, cyclohexyl-, allyl-, cyclopentenyl-, phenyl-, benzyl-, dimethylaminoethyl-, piperidinoethyl-, morpholinoethyl-, N-methylpiperazinoethyl-, diethylaminopropyl-, pyrrolidinopropyl-, morpholinopropyl-, N-benzyl-piperazinopropyl-isothiocyanate. Instead of the isothiocyanates, there may also be used substances which form such isothiocyanates (cf. Houben-Weyl, "Methoden de organischen Chemie," 4th edition, volume 9, pages 867–878) and the corresponding thiourethanes or dithiocarbamic acid esters.

The desulfurization of the thio-ureas of the general Formula IV is effected by the reaction with desulfurizing agents such as heavy metal oxides or heavy metal salts, for example, mercury oxide, silver oxide, lead oxide, arsenic trioxide, lead acetate, silver nitrate, mercury chloride or with oxidizing agents such as sodium hypochlorite. Carbodiimides which are formed intermediately are in general not isolated, since they pass under the reaction conditions, for example, in the case of compounds of the general Formula IV in which X represents the hydroxy group, into the compounds of the invention, whereas in the case of compounds of the general Formula IV in which X represents an alkoxy or alkanoyloxy group, it is necessary to treat the intermediate subsequently or simultaneously with inorganic or organic acids.

The reaction is carried out at temperatures in the range of from 20 to 200° C., preferably 50 to 120° C.; the reaction times vary between 15 minutes and 30 hours.

As reaction medium, there may be used water, lower alcohols such as methanol, ethanol, isopropanol, ethers such as diethyl ether, tetrahydrofurane, dioxane, furthermore glycol, glycol monomethyl and -ethyl ether, aromatic hydrocarbons such as benzene, toluene, xylene, chlorohydrocarbons such as methylene chloride, chloroform, dichloroethane, trichloroethylene or acetone or carbon disulfide, or mixtures thereof; the selection of the suitable solvent depends on the stability and the reactivity of the individual reaction components and reaction products.

The compounds of the general Formula V which are required as starting substances for the reaction according to (b) with the amines of the Formula VI or the salts thereof, can be prepared, for example, by reacting according to (a) compounds of the Formula II with thiourea. In this manner compounds of the Formula V are obtained in which $R_3$ represents the amino group. When compounds of the general Formula II in which X stands for a halogen atom, the hydroxy, sulfhydryl or an alkanoyloxy group, are reacted with carbon disulfide or alkali xanthogenates in the presence of bases such as alkali metal hydroxides (for example, in a manner analogous to that described in J. Pharm. Soc. Japan, 57, 54 (1937)), there are formed compounds of the general Formula V in which $R_3$ represents the sulfhydryl group. The mercapto compounds obtained may be alkylated, if required or desired, whereby $R_3$ obtains the meaning of the S-alkyl group. The compounds of the general Formula V in which $R_3$ represents a chlorine or a bromine atom are accessible, for example, from compounds of the general Formula V in which $R_3$ represents the amino group by way of the Sandmeyer reaction (for example, in a manner analogous to that described in Helv. Chim. Acta 32, 63–68 (1949)).

The reaction according to (c) which leads to the preparation of 3,1-benzothiazine derivatives is carried out at temperatures in the range of from 20 to 250° C., preferably 80 to 200° C.; the reaction times vary between 15 minutes and 24 hours. The selection of the reaction conditions depends on the reactivity of the compound of the general Formula V used. The use of a solvent or diluent, however, is not absolutely necessary. As solvents, there may be used mainly aromatic hydrocarbons such as benzene, toluene and xylenes, aliphatic and aromatic chlorohydrocarbons such as chloroform, tetrachloroethane, chlorobenzene, furthermore ethers such as tetrahydrofurane, dioxane, glycol dimethyl- and diethylene glycol diethyl ethers; in addition, an excess of the amine used may also serve as solvent. Depending on the boiling point of the amine used and of the solvent, the reaction is carried out in a closed vessel, if necessary.

For the preparation of benzothiazines of the Formula I by the reaction of compounds of the general Formula V in which $R_3$ stands for the amino group, according to (d), with reactive derivatives of alcohols of the general Formula VII, there may be used as alcohol derivatives especially the halides such as chlorides, bromides or iodides, furthermore the corresponding sulfates, carbonates and alkyl or aryl sulfonates of these alcohols, for example, methyl iodide, dimethyl sulfate, ethyl iodide, benzyl bromide, allyl bromide, dimethylaminoethyl chloride, piperidinopropyl chloride, bis-(diethylaminoethyl carbonate), ethyl-toluene sulfonate. The alkylation is carried out in the usual manner in the presence of basic condensation agents such as alkali metal carbonates and hydroxides, alkali metal alcoholates, alkali metal and alkaline earth metal amides and hydrides.

For the reaction according to (e), there may be used as starting substances derivatives of 2-acylamino-benzothiazine or -benzoxazine which may be substituted by the groups $R_1$ and $R_2$, for example, the corresponding aliphatic acylamino derivatives such as 2-acetylamino-, 2-propionylamino-, 2-butyrylamino-, 2-crotonylamino-4-phenyl-4H-3,1-benzothiazine or -benzoxazine or aromatic acylamino derivatives such as the 2-benzoylamino-4-phenyl-4H-3,1-benzothiazine or -benzoxazine derivatives. Halogenated aliphatic acyl compounds, for example, 2-chloroacetyl-, 2-chloropropionyl-, 2-chlorobutyryl-4-phenyl-4H-3,1-benzothiazine or -benzoxazine derivatives may also be used.

These acyl compounds are prepared in the usual manner by acylation of the 2-aminobenzothiazine- or oxazine derivatives, for example, by reaction of acid chlorides such as acetyl chloride, propionyl chloride, crotonyl chloride or of the corresponding anhydrides such as acetic acid anhydride, propionic acid anhydride, with 2-amino-4-phenyl-4H-3,1-benzothiazines or -benzoxazines which may be substituted by $R_1$ and $R_2$. The acyl compounds, especially the halogenated acyl compounds, can also be obtained by reaction of these 2-aminobenzothiazine or -benzoxazine derivatives with the corresponding carboxylic acids in the presence of a dehydrating agent, for example, dicyclohexylcarbodiimide.

Furthermore, there may be used as starting substances basically substituted acyl compounds such as 2-dialkylaminoacetyl- or 2-dialkylaminopropionyl-amino-4-phenyl-4H-3,1-benzothiazine or -benzoxazine derivatives, the dialkylamino group being low molecular weight dialkylamino groups, preferably dimethyl- or diethylamino groups, and the corresponding piperidino-, pyrrolidino-, N-methyl-piperazino-, morpholino- or N-benzyl-piperazino- acylamino-4-phenyl-4H-3,1-benzothiazine or -benzoxazine derivatives.

The reduction of the acyl derivatives is carried out according to the process of the invention in the usual manner with complex metal hydrides, in particular with lithium aluminum hydride, in inert solvents, preferably ethers such as dioxane, ether, tetrahydrofurane, if desired in admixture with aromatic hydrocarbons at temperatures in the range of from 0° C. to the boiling temperature of the solvent used.

If halogeno-acyl compounds are used, these may be either reacted with the corresponding amines such as dimethylamine, diethylamine, dipropylamine or with the corresponding heterocyclic amines such as piperidine, pyrrolidine, morpholine, N-methylpiperazine or N-benzylpiperazine or they may be first reduced in the manner described and the halogeno-alkyl compounds obtained are then reacted in the usual manner with the described amines. In this reaction it is of advantage to use an excess of the amine for binding the hydrohalic acid formed.

The reaction of compounds of the general Formula II with halogeno cyanides according to (f), which leads to benzoxazines exclusively, is preferably carried out in the presence of weak bases, for example, alkali metal or alkaline earth metal salts of fatty acids such as sodium acetate, alkali metal or alkaline earth metal carbonates, bicarbonates and hydroxides, at temperatures in the range of from −20° to 100° C. and reaction times from 30 minutes to 30 hours. As solvents and diluents, there may be used, for example, lower alcohols such as methanol, ethanol, isopropanol, ethers such as diethyl ether, tetrahydrofurane, dioxane, aromatic hydrocarbons such as benzene, toluene, xylene, chlorohydrocarbons such as methylene chloride, chlorform, dichloroethane, chlorobenzene, furthermore acetone and pyridine, or mixtures of these solvents. The cyanamide derivatives formed intermediately pass into the products of the invention either spontaneously or upon treatment with acids while undergoing ring closure.

For preparing benzothiazines of the Formula I there is also suitable the process described under (g). As starting substance of the Formula I, in which A represents an oxygen atom, there may be used, for example, 2-amino-4 - phenyl - 4H - 3,1 - benzoxazine, 2 - amino - 4 - phenyl - 6 - chloro - 4H - 3,1 - benzoxazine, 2 - methylamino-4 - phenyl - 4H - 3,1 - benzoxazine, 2 - ethylamino - 4-phenyl - 6 - chloro - 4H - 3,1 - benzoxazine, 2 - benzylamino - 4 - phenyl - 6 - chloro - 4H - 3,1 - benzoxazine, 2 - ethylamino - 4 - phenyl - 5 - chloro - 4H - 3,1 - benzoxazine, 2 - methylamino - 4 - phenyl - 6 - bromo - 4H-3,1 - benzoxazine, 2 - ethyl - amino - 4 - (p - methoxyphenyl) - 6 - chloro - 4H - 3,1 - benzoxazine, 2 - ethylamino - 4 - (p - chlorophenyl) - 6 - chloro - 4H - 3,1-benzoxazine, 2 - ethylamino - 4 - (o - fluorophenyl) - 6-chloro - 4H - 3,1 - benzoxazine, 2 - ethylamino - 4 - phenyl - 7 - chloro - 4H - 3,1 - benzoxazine, 2 - benzylamino-4 - phenyl - 6 - methoxy - 4H - 3,1 - benzoxazine, 2-amino - 4 - methyl - 4H - 3,1 - benzoxazine, 2 - ethylamino - 4 - methyl - 4H - 3,1 - benzoxazine, 2 - methylamino - 4 - ethyl - 4H - 3,1 - benzoxazine, 2 - ethylamino - 4-methyl - 6 - chloro - 4H - 3,1 - benzoxazine, 2 - cyclohexylamino-4-methyl-6-methoxy-4H-3,1-benzoxazine.

The reaction of these compounds with hydrogen sulfide or inorganic sulfides such as alkali metal sulfides or phosphorus sulfides, preferably phosphorus pentasulfide, or with mixtures of these compounds is effected at temperatures in the range of from 50 to 200° C., preferably 80 to 160° C., if desired with the use of an organic solvent such as pyridine, an aromatic hydrocarbon such as benzene, toluene, or xylene, or an aliphatic or aromatic chlorohydrocarbon such as carbon tetrachloride, tetrachloroethane or chlorobenzene. Depending on the boiling point of the solvent used and on the required reaction temperature, in particular if hydrogen sulfide is used, the reaction may be carried out under pressure, if necessary.

The products of the present invention are basic compounds and they, therefore, can be converted into the corresponding salts with the aid of inorganic or organic acids. As inorganic acids, there may be used, for example, hydrohalic acids such as hydrochloric acid and hydrobromic acid, sulfuric acid, phosphoric acid and amidosulfonic acid. As organic acids, there may be used, for example, acetic acid, propionic acid, lactic acid, glycolic acid, glutonic acid, fumaric acid, maleic acid, oxalic acid, succinic acid, tartaric acid, benzoic acid, salicylic acid, citric acid, aceturic acid, oxyethane-sulfonic acid and ethylene diamino-tetracetic acid, embonic acid, naphthalene-disulfonic acid or toluene-sulfonic acid.

The products of the present invention have valuable pharmacological properties with partly extremely low toxicity; in particular, they have a centrally depressive as well as a stimulating, tranquillizing, noradrenalin activating and anesthesia prolonging and, in addition, analgesic and spasmolytic activity.

The products of the present invention, especially the benzothiazine derivatives such, for example, as 2-ethylamino - 4 - phenyl - 6 - chloro - 4H - 3,1 - benzothiazine ($LD_{50}=>6$ g./kg. in mice, per os), are distinctly superior to known compounds of similar structure as, for example, 2 - ethylamino - 4H - 3,1 - benzothiazine ($LD_{50}=800$ mg./kg.), with regard to their centrally depressive action. In addition thereto, they possess a remarkable delayed centrally depressive action. The other properties by which the products of the present invention are distinguished include anesthesia-prolonging properties and the increase of the physiologic action of the catecholamines as well as anticataleptic effects which correspond to the thymoleptic action in humans. The last-mentioned property is especially marked in benzoxazine derivatives, for example, the 2 - ethylamino - 4 - phenyl - 6 - chloro - 4H - 3,1 - benzoxazine ($LD_{50}=600$ mg./kg), whereas the known 2-ethylamino - 4H - 3,1 - benzoxazine ($LD_{50}=320$ mg./kg.) has not this property.

The centrally depressive action was determined by measuring the spontaneous and provoked motility in a mouse and by the somnolence test (Nieschulz, O. et al., Arzneimittelforschung 6, 651 (1956)); the influence on anesthesia was determined in the usual manner. Breaking through or unblocking of catalepsy in a mouse produced by 2 - oxo - 3 - isobutyl - 9,10, - dimethoxy - 1,2,3,4,6,7-hexahydro - 11 - b - H - benzo[α] - quinolizine (tetrabenazine) was tested on a modification of the test arrangement described by Sulser et al. (Fed. Proc. 19, 268 (1960), and in Ann. N.Y. Acad. Sci. 96, 279 (1962)). The test for noradrenalin potentiating action was carried out on the blood pressure of a cat.

The products of the present invention may be applied as such or in the form of corresponding salts, if desired in admixture with pharmaceutically usual carrier substances. The pharmaceutical preparations may be in the form of tablets, dragées, capsules or suppositories, or they may be in liquid form, for example, in the form of solutions, suspensions or emulsions. The tablets, dragées and capsules may have a total weight ranging from 100 to 1000 mg., and their content of active substance may be in the range of from 5 to 50 mg., thus 0.5 to 50% by weight. The preparations can be administered several times a day.

As the pharmaceutically usual carrier substances, there may be used those substances which do not react with the products of the invention, for example, water, gelatin, lactose, starch, magnesium stearate, talcum, vegetable oils, polyalkylene glycols, and similar substances. They may be sterilized and/or combined with stabilisers. The pharmaceutical preparations may also contain other therapeutically valuable substances.

The products of the present invention serve for the treatment of psychical diseases and disorders, for example, depressions, psychoneuroses, discords and anxiety of neurotic and psychotic genesis.

The following examples illustrate the invention but they are not intended to limit it thereto:

EXAMPLE 1

2-amino-4-phenyl-4H-3,1-benzothiazine 39.8 grams of 2-aminobenzhydrol and 15.2 grams of thiourea are boiled under reflux, for 1½ hour, while stirring, in 100 milliliters of hydrobromic acid having a strength of 48%. After cooling, the reaction mixture is made alkaline by the addition of dilute sodium hydroxide solution and extracted several times with ether. The ether solution, which has been washed with water and dried over sodium sulfate, is evaporated and the solid residue which remains behind is recrystallized from a mixture of benzene and petroleum ether. In this manner 40.8 grams (85% of the theory) of 2-amino-4-phenyl-4H-3,1-benzothiazine are obtained in the form of colorless crystals which melt at 148–149° C.

EXAMPLE 2

2-methylamino-4-phenyl-4H-3,1-benzothiazine 30 grams of 2-aminobenzhydrol are dissolved in 450 milliliters of ether and heated under reflux for 1 hour with 11 grams of methyl-isothiocyanate. The ether is then removed by evaporation and the residue is boiled under reflux for 30 minutes with 10 milliliters of concentrated hydrochloric acid. The reaction mixture is diluted with water, the pH of the mixture is adjusted to an alkaline value by means of dilute sodium hydroxide solution and the mixture is extracted several times with benzene. From the benzene solution which has been washed with water and dried over sodium sulfate, there is obtained, after removal of the solvent under reduced pressure, 2-methylamino-4-phenyl-4H-3,1-benzothiazine in the form of a yellow oil, which solidifies soon in crystalline form. Recrystallization from a mixture of benzene and petroleum ether yields 29.5 grams (78% of the theory) of colorless crystals which melt at 99–100° C.

EXAMPLE 3

2-amino-4-phenyl-6-chloro-4H-3,1-benzothiazine 46.7 grams of 5-chloro-2-aminobenzhydrol and 15.2 grams of thiourea are heated under reflux, for 1 hour, while stirring, in 100 milliliters of hydrobromic acid having a strength of 48%. At the beginning, the hydrobromide of 2-amino-4-phenyl-6-chloro-4H-3,1-benzothiazine dissolves, but starts soon to separate as crystalline precipitate which, after cooling, is isolated by filtration with suction, washed with acetone and recrystallized from ethanol. 60.2 grams (84% of the theory) of colorless crystals melting at 277–278° C. (decomp.) are obtained.

For preparing the free base the above hydrobromide need not be isolated. In this case the reaction mixture is diluted with a quantity of water sufficient for dissolving the salt and rendered alkaline with dilute sodium hydroxide solution. After removal of the precipitate by filtration with suction and recrystallization from a mixture of benzene and petroleum ether, there are obtained 48.5 grams (88% of the theory) of 2-amino-4-phenyl-6-chloro-4H-3,1-benzothiazine melting at 170–171° C.

EXAMPLE 4

2-amino-4-phenyl-6-bromo-4H-3,1-benzothiazine

By the reaction of 27.8 grams of 5-bromo-2-aminobenzhydrol with 7.6 grams of thiourea in 50 milliliters of hydrobromic acid having a strength of 48% in a manner analogous to that described in Example 3, there are obtained 26 grams (81% of the theory) of 2-amino-4-phenyl-6-bromo-4H-3,1-benzothiazine melting at 198–199° C.

EXAMPLE 5

2-methylamino-4-phenyl-6-chloro-4H-3,1-benzothiazine (a) A solution of 46.7 grams of 5-chloro-2-amino-benzhydrol in 500 milliliters of ether is combined with 18.3 grams of methyl-isothiocyanate and the whole is allowed to stand for 24 hours at room temperature. Two thirds of the solvent are removed by distillation under reduced pressure and the crystalline precipitate is isolated by filtration with suction. In this manner 50.5 grams (83% of the theory) of pure N-methyl-N′-[4-chloro-2(α-hydroxybenzyl)]-phenyl-thiourea melting at 164–165° C. are obtained.

(b) 30.6 grams of the thiourea obtained according to (a) are boiled under reflux for 1 hour, while stirring, in 100 milliliters of hydrobromic acid having a strength of 48%. The cooled reaction mixture is rendered alkaline by means of dilute sodium hydroxide solution and extracted several times with ethyl acetate. After evaporation of the solvent under reduced pressure, there remains behind a yellowish oil which solidifies in crystalline form after some time. By recrystallization from a mixture of benzene and petroleum ether, there are obtained 25.6 grams (89% of the theory) of 2-methyl-amino-4-phenyl-6-chloro-4H-3,1-benzothiazine in the form of colorless crystals which melt at 109.5–110.5° C.

(c) 23.4 grams of 5-chloro-2-aminobenzhydrol and 7.3 grams of methyl-isothiocyanate are boiled under reflux for 2 hours, while stirring, in 50 milliliters of hydrobromic acid having a strength of 48%. The reaction mixture is then worked up as described under (b) and the reaction product obtained is purified by chromatography on basic aluminium oxide, activity III, with the use of benzene as the eluting agent. The 2-methylamino-4-phenyl-6-chloro-4H-3,1-benzothiazine obtained in this manner melts at 109.5–110.5° C. and is identical with the product described under (b). The yield is 20.7 grams (72% of the theory).

EXAMPLE 6

2-ethylamino-4-phenyl-6-chloro-4H-3,1-benzothiazine (a) 35 grams of 5-chloro-2-aminobenzhydrol and 26 grams of ethyl-isothiocyanate are heated for 5 minutes on the steam bath and then allowed to stand overnight at room temperature. The crystal magma thus formed is boiled with 75 milliliters of benzene in order to remove the excess of isothiocyanate. In this manner 43 grams (89% of the theory) of N-ethyl-N'-[4-chloro-2-(α-hydroxybenzyl)]-phenyl-thiourea in the form of colorless crystals which melt at 147–148° C. are obtained; the melting point remains constant even after recrystallization from a mixture of ethyl acetate and petroleum ether.

(b) 32 grams of the thiourea prepared according to (a) are heated as described in Example 5(a) with hydrobromic acid, whereby 25.6 grams (85% of the theory) of 2-ethylamino-4-phenyl-6-chloro-4H-3,1-benzothiazine melting at 118–120° C. are obtained.

(c) In a manner analogous to that described in Example 5(c), the reaction of 23.4 grams of 5-chloro-2-aminobenzhydrol with 9.0 grams of ethyl-isothiocyanate yields 20.5 grams (68.4% of the theory) of 2-ethylamino-4-phenyl-6-chloro-4H-3,1-benzothiazine melting at 118–120° C.

EXAMPLE 7

2-benzylamino-4-phenyl-6-chloro-4H-3,1-benzothiazine 13,7 grams of 2-amino-4-phenyl-6-chloro-4H-3,1-benzothiazine prepared according to Example 3 are boiled for 2½ hours under reflux in 25 milliliters of benzylamine. After cooling, the reaction mixture is diluted with petroleum ether whereupon 2-benzoylamino-4-phenyl-6-chloro-4H-3,1-benzothiazine separates at first in the form of an oil. Chromatography on basic aluminum oxide with the activity III and with a mixture of benzene and petroleum ether in the ratio of 1:1 as the eluting agent, yields 12.7 grams (70% of the theory) of colorless crystals melting at 107–109° C.

EXAMPLE 8

2-phenylamino-4-phenyl-6-chloro-4H-3,1-benzothiazine (a) By the reaction of 23.4 grams of 5-chloro-2-aminobenzhydrol with 13.5 grams of phenyl-isothiocyanate in a manner analogous to that described in Example 5(c), there are obtained 26.5 grams (76% of the theory) of 2-phenylamino-4-phenyl-6-chloro-4H - 3,1 - benzothiazine melting at 148–150° C. (from a mixture of benzene and petroleum ether).

(b) 5.5 grams of the 2-amino-4-phenyl-6-chloro-4H-3,1-benzothiazine prepared according to Example 3 are boiled under reflux for 5 hours in 15 milliliters of aniline. The major part of the excess of aniline is then removed by distillation under reduced pressure and the oily residue is chromatographed on aluminium oxide as described in Example 7. 5.0 grams (72% of the theory) of 2-phenylamino-4-phenyl-6-chloro-4H-3,1-benzothiazine melting at 148–150° C., which is identical with the compound described under (a), are obtained.

EXAMPLE 9

2-(3'-diethylaminoethyl)-amino-4-phenyl-6-chloro-4H-3,1-benzothiazine 35 grams of 5-chloro-2-aminobenzhydrol and 25 grams of diethylaminoethyl-isothiocyanate are boiled for 2 hours under reflux, while stirring, in 100 milliliters of hydrobromic acid having a strength of 48%. After cooling, the reaction mixture is rendered alkaline by means of dilute sodium hydroxide solution, while cooling, and extracted with benzene. The oily residue which remains behind after separation of the solvent by evaporation is chromatographed on basic aluminium oxide, activity III, with benzene as the eluting agent, whereby 44 grams (79% of the theory) of 2-(2'-diethylamino-ethyl)-amino-4-phenyl-6-chloro-4H-3,1-benzothiazine are obtained in the form of a light yellow oil. The oxalate melts at 150–152° C.

EXAMPLE 10

2-(3'-diethylaminopropyl)-amino-4-phenyl-6-chloro-4H-3,1-benzothiazine (a) 11.7 grams of 5-chloro-2-aminobenzhydrol and 9.5 grams of 3-diethylaminopropyl-thiourea are heated for 1½ hours under reflux in 30 milliliters of hydrobromic acid having a strength of 48%. Working up yields 13.0 grams (67% of the theory) of oily 2-(3'-diethylaminopropyl)-amino-4-phenyl-6-chloro-4H - 3,1 - benzothiazine, the oxalate of which melts at 160–162° C.

(b) The same compound is obtained in a yield of 73% when operating in a manner analogous to that of Example 9 and using 23.4 grams of 5-chloro-2-aminobenzhydrol and 17.0 grams of 3-diethylaminopropyl-isothiocyanate. Melting point of the oxalate: 160–162° C.

EXAMPLE 11

2-amino-4-phenyl-3-chloro-4H-3,1-benzothiazine 23.4 grams of 6-chloro-2-aminobenzhydrol (melting point 139–141° C. (from ethanol), prepared by the reduction of 6-chloro-2-aminobenzophenone with sodium boron hydride) and 7.6 grams of thiourea are heated for 2 hours under reflux, while stirring, in 75 milliliters of hydrobromic acid having a strength of 48%. After dilution of the cooled reaction mixture with water, the precipitate which has separated is filtered with suction and shaken with methylene chloride and dilute sodium hydroxide solution. Upon evaporation of the methylene chloride solution which has been washed with water and dried over sodium sulfate, 20.6 grams (75% of the theory) of 2-amino-4-phenyl-5-chloro-4H - 3,1 - benzothiazine in the form of almost colorless crystals which after recrystallization from a mixture of benzene and petroleum ether melt at 207–209° C. are obtained.

EXAMPLE 12

26.8 grams of 5,4'-dichloro-2-aminobenzhydrol (melting point 130–131° C. (from methanol/water), prepared from 5,4'-dichloro-2-aminobenzophenone by reduction with sodium boron hydride) and 7.6 grams of thiourea are heated for 2 hours under reflux, while stirring, in a solution of 37.7 grams of p-toluenesulfonic acid in 60 milliliters of water. After cooling, the reaction mixture is rendered alkaline by means of dilute sodium hydroxide solution and extracted with benzene. By evaporation of the dried benzene solution and recrystallization of the residue from a mixture of benzene and petroleum ether, there are obtained 26 grams (84% of the theory) of 2-amino-4-(p-chlorophenyl)-6-chloro-4H-3,1-benzothiazine in the form of colorless crystals which melt at 189–191° C.

In the same maner there are obtained from 26.4 grams of 2-amino-5-chloro-4'-methoxy-benzhydrol 20.4 grams (67% of the theory) of 2-amino-4-(p-methoxy-phenyl)-6-chloro-4H-3,1-benzothiazine melting at 166–168° C. (from a mixture of benzene and petroleum ether).

EXAMPLE 13

2-allylamino-4-phenyl-6-chloro-4H-3,1-benzothiazine 47 grams of 5-chloro-2-aminobenzhydrol, dissolved in 300 milliliters of ether, are boiled for 3 hours under reflux with 20 grams of allyl-isothiocyanate. The oil which remains behind after removal of the ether by distillation is then heated for 30 minutes on the steam bath with 300 milliliters of concentrated hydrochloric acid and after cooling, the reaction mixture is rendered alkaline by means of sodium hydroxide solution. By extraction with benzene, there are obtained 58 grams of 2-allyl-amino-4-phenyl-6-chloro-4H-3,1-benzothiazine in the form of a brown oil. For purification, this oil is first dissolved in a small amount of acetone, then added to a solution in acetone of 23 grams of oxalic acid dihydrate, whereupon, after the addition of ether, 53 grams of the oxalate can be isolated in the form of colorless crystals. From the oxalate, there are obtained by shaking with a dilute sodium hydroxide solution and methylene chloride and evaporation of the organic phase, 41.5 grams (66% of the theory) of pure 2-allylamino-4-phenyl-6-chloro-4H-3,1-benzothiazine which melts at 111–113° C. (from petroleum ether).

EXAMPLE 14

2-ethylamino-4-phenyl-4H-3,1-benzothiazine (a) 20 grams of 2-aminobenzhydrol and 13 grams of ethyl-isothiocyanate are heated for 10 minutes to 90° C. and then rapidly cooled. The reaction mixture is digested with ether, the crystal magma that has formed is filtered with suction and afterwashed with a small amount of ether; in this manner 23 grams (80% of the theory) of N-ethyl-N'-[2-(α-hydroxybenzyl)]-phenyl-thiourea in the form of colorless crystals which melt at 120–122° C. are obtained.

(b) 28.6 grams of the thiourea obtained according to (a) are boiled for 30 minutes, while stirring, under reflux, in 200 milliliters of concentrated hydrochloric acid. After cooling, the major part of the hydrochloric acid is removed by cautious decantation and the oily residue is shaken with ether and dilute sodium hydroxide solution. Upon evaporation of the ether phase which has been washed with water and dried over sodium sulfate, there remains behind 2-ethylamino-4-phenyl-4H-3,1-benzothiazine in the form of a yellowish oil; by dissolving it and allowing it to crystallize from cyclohexane, there are obtained 19.5 grams of colorless crystals (73% of the theory) melting at 76–78° C.

EXAMPLE 15

2-ethylamino-4-(p-methoxyphenyl)-6-chloro-4H-3,1-benzothiazine 35 grams of 2-(ω-ethyl-thioureido)-5-chloro-4'-methoxybenzhydrol (melting point 132–134° C. (from a mixture of ethanol and water), prepared from 2-amino-5-chloro-4'-methoxybenzhydrol and ethyl-isothiocyanate) are boiled in a manner analogous to that described in Example 14 for 1 hour under reflux in 150 milliliters of concentrated hydrochloric acid. 28.5 grams (85% of the theory) of 2-ethylamino-4-(p-methoxyphenyl)-6-chloro-4H-3,1-benzothiazine in the form of colorless crystals which melt at 107–109° C. (from a mixture of ethanol and water) are thus obtained.

EXAMPLE 16

(a) 35 grams of 5-chloro-2-amino-benzhydrol are dissolved in just the sufficient amount of ether, 30 grams of isopropylisothiocyanate are added and the reaction mixture is allowed to stand for several days at room temperature. Two-thirds of the solvent are then distilled off under reduced pressure and the crystalline precipitate is isolated by filtration with suction and after-washing with a small amount of ether. In this manner there are obtained 40 grams (80% of the theory) of pure N-isopropyl-N'-[4-chloro-2-(α-hydroxybenzyl)]-phenylthiourea which melts at 127–129° C.

(b) 33.5 grams of the thiourea prepared according to (a) are boiled for 1 hour under reflux, while stirring, in 100 milliliters of hydrobromic acid having a strength of 48%. The reaction mixture is then rendered alkaline by means of a sodium hydroxide solution, while cooling, and then extracted with benzene or methylene chloride. Upon evaporation of the organic phase which has been washed with water and dried over sodium sulfate, there remains behind 2-isopropylamino-4-phenyl-6-chloro-4H-3,1-benzothiazine in the form of a yellowish oil; after dissolution and recrystallization from a mixture of benzene and petroleum ether the compound is obtained in the form of colorless crystals which melt at 114–116° C. Yield: 26 grams (82% of the theory).

In a manner analogous to that described above there can be obtained the following compounds:

N-butyl-N'-[4-chloro-2-(α - hydroxybenzyl)] - phenylthiourea, melting point 116–118° C.;

2-butylamino-4-phenyl-6-chloro-4H-3,1 - benzothiazine, melting point 88–90° C.;

N-cyclohexyl-N'-[4-chloro-2 - (α - hydroxybenzyl)]-phenyl-thiourea, melting point 143–145° C.;

2-cyclohexylamino-4-phenyl-6-chloro - 4H - 3,1-benzothiazine, melting point 160–162° C.;

N - ethyl - N'-[4-bromo-2-(α-hydroxybenzyl)]-phenylthiourea, melting point 147–149° C.;

2-ethylamino-4-phenyl-6-bromo-4H-3,1 - benzothiazine, melting point 99–101° C.

EXAMPLE 17

(a) 23 grams of 5-chloro-2-amino-benzhydrol are heated together with 20 grams of propyl-isothiocyanate for 15 minutes on the steam bath and rapidly cooled to room temperature. The crystal magma that has formed during standing of the reaction mixture over night is filtered with suction and after-washed with a small amount of a mixture of ether and petroleum ether in the ratio of 1:1; 28.5 grams (85% of the theory) of N-propyl-N'-[4-chloro-2-(α-hydroxybenzyl)]-phenyl - thiourea in the form of colorless crystals melting at 96–98° C. are obtained.

(b) 33.5 grams of the thiourea prepared according to (a) are heated in a manner analogous to that described in Example 16(b) with hydrobromic acid, whereupon 28 grams (88% of the theory) of 2-propylamino-4-phenyl-6-chloro-4H-3,1-benzothiazine are obtained in the form of colorless needles which melt at 105–106° C. (from a mixture of benzene and petroleum ether).

In a manner analogous to that described above, there can be prepared the following compounds:

2-(ω-ethyl-thioureido)-5,4'-dichlorobenzhydrol, melting point 136–138° C.;

2-ethylamino-4-(p-chlorophenyl)-6-chloro - 4H - 3,1-benzothiazine, melting point 126–127° C. from a mixture of ethanol and water).

EXAMPLE 18

(a) A solution of 25 grams of 2-amino-5-chloro-2'-fluorobenzhydrol (melting point 99–100° C., prepared from 2-amino-5-chloro-2'-fluorobenzophenone by reduction with sodium boron hydride) in 250 milliliters of ether is combined with 13 grams of ethyl-isothiocyanate and the reaction mixture is stored for several days at room temperature. Thereafter, the solvent is removed by distillation under reduced pressure, the oily residue is digested with cyclohexane and the crystalline precipitate of 2-(ω-ethyl-thioureido)-5-chloro - 2' - fluorobenzhydrol which has separated is filtered with suction with after-washing with cyclohexane. By recrystallization from a mixture of benzene and cyclohexane there are obtained 26 grams (77% of the theory) of colorless crystals melting at 129–130° C.

(b) 17 grams of the compound obtained according to (a) are boiled under reflux for 5 minutes, while stirring vigorously, with 100 milliliters of hydrobromic acid having a strength of 48%. The cooled reaction mixture is diluted cautiously with water, after sometime cautiously decanted and the residue is shaken with methylene chloride and dilute sodium hydroxide solution. From the organic phase which has been washed with water and dried over sodium sulfate there are obtained, after removal of the solvent by distillation, 16 grams of 2-ethylamino-4-(o-fluorophenyl)-6 - chloro-4H-3,1 - benbothiazine in the form of a highly viscous colorless oil.

In a manner analogous to that described above there can be prepared the following compounds:

2 - amino-5-chloro-3'-fluorobenzhydrol, melting point 122–124° C.;

2 - (ω - ethyl-thioureido)-5-chloro-3'-fluorobenzhydrol, melting point 144–145° C.;

2 - ethylamino-4-(m - fluorophenyl)-6-chloro-4H-3,1-benzothiazine, melting point 124–125° C.

2 - amino-5-chloro-4'-fluorobenzhydrol, melting point 125–126° C.;

2 - (ω - ethyl-thioureido)-5-chloro-4'-fluorobenzhydrol, melting point 141–142° C.;

2-ethylamino-4-(p-fluorophenyl)-6-chloro - 4H - 3,1-benzothiazine, melting point 133–134° C.

EXAMPLE 19

2-ethylamino-4-phenyl-6-nitro-4H-3,1-benzothiazine

A suspension of 29.3 grams of 2-amino-5-nitrobenzhydrol (melting point 121–123° C. (from benzene), prepared by reduction of 2-amino-5-nitrobenzophenone with sodium boron hydride) in 120 milliliters of glacial acetic acid is combined with 10.5 grams of ethyl-isothiocyanate and 60 milliliters of hydrobromic acid having a strength of 48% and the mixture is then heated on the steam bath for 20 hours. After cooling, it is diluted with water, rendered alkaline with sodium hydroxide solution and extracted several times with methylene chloride. The resinous residue which remains behind upon evaporation of the methylene chloride solution is then chromatographed on neutral aluminium oxide, activity II, with benzene as the eluting agent. 14.3 grams (38% of the theory) of 2-ethylamino-4-phenyl-6-nitro - 4H - 3,1 - benzothiazine are thereby obtained in the form of light yellow crystals which melt at 121–122° C. (from a mixture of benzene and cyclohexane).

EXAMPLE 20

2-ethyamino-4-phenyl-4H-3,1-benzothiazine (a) 7.5 grams of freshly distilled ethyl isocyanate in 25 milliliters of chloroform are introduced dropwise, while stirring and cooling, into a solution of 20 grams of 2-aminozenzhydrol in 175 milliliters of chloroform. The reaction mixture is stirred for 30 minutes at room temperature, the solvent is removed by distillation under reduced pressure and the brownish oil which remains behind is taken up in hot benzene. After cautious addition of petroleum ether, 20 grams (74% of the theory) of N-ethyl-N'-[2 - (α - hydroxybenzyl)]-phenyl-urea precipitate in the form of colorless crystals which melt at 132–134° C.

(b) 13.5 grams of the urea obtained according to (a) are boiled under reflux for 2 hours, while stirring, with 25 grams of finely pulverized phosphorus pentasulfide in 75 milliliters of pyridine. The reaction mixture is combined, while cooling, with 250 milliliters of binormal NaOH, stirred for 30 minutes at room temperature and, after further dilution with water, it is extracted with ether. After evaporation of the ether solution which has been dried over sodium sulfate under reduced pressure, there remains behind a brownish oil from which 7.6 grams of 2-ethylamino-4-phenyl-4H-3,1-benbothiazine can be extracted with hot petroleum ether.

By recrystallization from petroleum ether, colorless crystals are obtained which melt at 76–78° C. and which show no melting point depression with the compound prepared according to Example 14.

EXAMPLE 21

2-cyclohexylamino-4-phenyl-6-chloro-4H-3,1-benbothiazine (a) 70 grams of 5-chloro-2-aminobenzhydrol and 90 milliliters of hydrogen sulfide are added to a solution of 60 grams of potassium hydroxide in 300 milliliters of absolute ethanol and the mixture is heated for 5 hours under reflux on the steam bath. The residue obtained after evaporation of the solvent is dissolved in dilute sodium hydroxide solution, separated by filtration from a small amount of insoluble matter and acidified with dilute hydrochloric acid. By extraction with benzene there are obtained 69 grams (79% of the theory) of 2-mercapto-4-phenyl-6-chloro - 4H - 3,1 - benzothiazine which crystallizes from ethanol in the form of weakly yellowish needles that melt at 158–160° C.

(b) 14.6 grams of the compound obtained according to (a) are boiled for 6 hours under reflux in 25 milliliters of cyclohexylamine. After removal of the excess cyclohexylamine in a rotary evaporator, the residue is chromatographed on basic aluminum oxide of the activity degree II with benzene as the eluting agent, whereby 12.3 grams (69% of the theory) of 2-cyclohexylamino-4-phenyl-6-chloro-4H-3,1 - benzothiazine are obtained. After recrystallization from a mixture of benzene and petroleum ether the compound melts at 160–162° C. and shows no melting point depression with a sample prepared according to Example 16.

EXAMPLE 22

2-benzylamino-4-phenyl-6-chloro-4H-3,1-benzothiazine (a) 15 grams of 2-methylmercapto-4-phenyl-6-chloro-4H-3,1-benzothiazine (prepared by methylation of 2-mercapto-4-phenyl-6-chloro-4H-3,1-benzothiazine with methyl iodide, melting point 114–116° C.) are boiled for 9 hours under reflux in 30 milliliters of benzylamine. After removal of the major quantity of excess benzylamine by distillation under reduced pressure, residue is chromatographed on basic aluminium oxide having an activity degree of II with benzene as the eluting agent, whereby 12 grams of 2-benzylamino-4-phenyl-6-chloro-4H-3,1-benzothiazine are obtained in the form of a light yellow oil. The compound crystallizes from a mixture of benzene and petroleum ether in colorless small needles which melt at 107–109° C.; it is identical with the compound described in Example 7.

EXAMPLE 23

2-ethylamino-4-(α-naphthyl)-4H-3,1-benzothiazine (a) 13 grams of ethyl-isothiocyanate are added to a solution of 25 grams of 2-amino-α-naphthyl-benzyl alcohol (melting point 117–119° C., prepared by catalytical hydrogenation of 2-aminophenyl-α-naphthyl-ketone with Raney nickel in methanol at room temperature and ordinary pressure) in 750 milliliters of ether and the whole is stored for several days at room temperature. 2-(ω-ethyl-thioureido)-α-naphthyl-benzyl alcohol which separates upon trituration in crystalline form is isolated by filtration with suction and washed with a small amount of ether. In this manner 22 grams (66% of the theory) of colorless crystals are obtained which melt at 149–150° C.

(b) 17 grams of the compound obtained according to (a) are heated in a manner analogous to that described in Example 18(b) with hydrabromic acid, whereby 13.5 grams (85% of the theory) of 2-ethylamino-4-(α-naphthyl)-4-H-3,1-benzothiazine are obtained in the form of colorless crystals with a melting point of 155–157° C. (from a mixture of benzene and petroleum ether).

EXAMPLE 24

2-ethylamino-4-phenyl-6-chloro-4H-3,1-benzothiazine 14 grams of 2-ethylamino-4-phenyl-6-chloro-4H-3,1-benzoxazine in 100 milliliters of pyridine are boiled for 2 hours under reflux, while stirring, with double the amount by weight of phosphorus pentasulfide. After cooling, 500 milliliters of dilute sodium hydroxide solution are added and the whole is further stirred for 1 hour at room temperature. The reaction mixture is then filtered with suction, the colorless residue is thoroughly washed with water, dried and recrystallized from a mixture of benzene and petroleum ether. In this manner, 11 grams (73% of the theory) of 2-ethylamino-4-phenyl-6-chloro-4H-3,1-benzothiazine are obtained in the form of colorless crystals which melt at 118–120° C. (the mixed melting point with a compound prepared according to Example 6(b) shows no depression).

EXAMPLE 25

2-amino-4-methyl-4H-3,1-benzothiazine 27.4 grams of 2-amino-α-methyl-benzyl alcohol (prepared by catalytical hydrogenation of 2-nitro-α-methyl-benzyl alcohol in ethanol at room temperature and 20 atmospheres gauge pressure $H_2$ in the presence of palladium; melting point 58–59° C. from a mixture of benzene and petroleum ether) and 15.2 grams of thiourea are boiled for 1 hour under reflux, while stirring, in 100 milliliters of hydrobromic acid having a strength of 48%. After it has cooled, the reaction mixture is rendered alkaline by means of dilute sodium hydroxide solution and extracted several times with methylene chloride. Evaporation of the methylene chloride solution which has been washed with water and dried over sodium sulfate yields 2-amino-4-methyl-4H-3,1-benzothiazine in the form of a brownish oil which solidifies in crystalline form after several hours. Recrystallization from a mixture of benzene and petroleum ether yields 32.3 grams (91% of the theory) of colorless crystals which melt at 128–130° C.

EXAMPLE 26

2-methylamino-4-methyl-4H-3,1-benzothiazine (a) 27 grams of 2-amino-α-methyl-benzyl alcohol and 22 grams of methyl-isothiocyanate are heated for 5 to 10 minutes to 100° C. and then rapidly cooled. The mixture is then digested with benzene, filtered with suction and the precipitate is again boiled with a small quantity of benzene. In this manner 39 grams (93% of the theory) of N-methyl-N′-[2-(α-hydroxyethyl)]-phenyl-thiourea melting at 121–122° C. are obtained. A sample recrystallized for analysis from a mixture of ethyl acetate and petroleum ether shows no elevation of the melting point.

(b) 21 grams of the thiourea prepared according to (a) are boiled for 1 hour under reflux, while stirring, in 100 milliliters of hydrobromic acid having a strength of 48%. The cooled reaction mixture is rendered alkaline by means of dilute sodium hydroxide solution and extracted several times with benzene. After evaporation of the benzene solution which has been washed with water and dried over sodium sulfate, there remains behind 2-methylamino-4-methyl-4H-3,1-benzothiazine in the form of a colorless oil which crystallizes upon trituration. By recrystallization from a mixture of ethanol and water, there are obtained 14.5 grams (76% of ehe theory) of colorless crytsals which melt at 83–84° C. From a mixture of benzene and petroleum ether there crystallizes sometimes a higher-melting modification having a melting point of 92–93° C.

EXAMPLE 27

2-ethylamino-4-methyl-4H-3,1-benzothiazine (a) In a manner analogous to that described in Example 26(a), there are obtained by the reaction of 27 grams of 2-amino-α-methyl-benzyl alcohol with 35 grams of ethyl-isothiocyanate, 41 grams (92% of the theory) or N-ethyl-N′-[2-(α-hydroxyethyl)] phenyl-thiourea, melting at 108–110° C. (from benzene).

(b) 22.4 grams of the thiourea obtained according to (a) are heated with hydrobromic acid as described in Example 26(b), whereby 16.3 grams (79% of the theory) of 2-ethylamino-4-methyl-4H-3,1-benzothiazine are obtained in the form of colorless crystals melting at 90–92° C. (from a mixture of ethanol and water).

EXAMPLE 28

2-cyclohexylamino-4-methyl-4H-3,1-benzothiazine 27.8 grams of N-cyclohexyl-N′-[2-(α-hydroxyethyl)]-phenyl thiourea (melting point 143–145° C., from a mixture of ethyl acetate and petroleum ether) obtained in a yield of 83% by the reaction of 2-amino-α-methyl-benzyl alcohol with cyclohexyl-isothiocyanate according to Example 26 (a), are heated for 45 minutes under reflux, while stirring, in 100 milliliters of hydrobromic acid having a strength of 48%. After working up as described in Example 26 (b), there are obtained 22.0 grams (85% of the theory) of 2-cyclohexyl-amino-4-methyl-4H-3,1-benzothiazine in the form of colorless crystals which melt at 128–130° C. (from petroleum ether).

EXAMPLE 29

2-ethylamino-4-methyl-4H-3,1-benzothiazine 19 grams of 2-ethylamino-4-methyl-4H-3,1-benzoxazine are heated together with 40 grams of phosphorus pentasulfide in 200 milliliters of toluene for 3 hours under reflux, while stirring. After the mixture has cooled, it is decanted and the solvent is removed under reduced pressure. The remaining residue yields, after recrystallization from a mixture of benzene and petroleum ether or from a mixture of ethanol and water, 13.5 grams (65% of the theory) of 2-ethylamino-4-methyl-4H-3,1-benzothiazine melting at 91–92° C.

EXAMPLE 30

2-isopropylamino-4-methyl-4H-3,1-benzothiazine (a) 54 grams of 2-amino-α-methyl-benzyl alcohol and 80 grams of isopropyl-isothiocyanate are heated for 10 minutes to 100° C. The reaction product which solidifies in crystalline form upon cooling is purified by recrystallization from a mixture of ethyl acetate and petroleum ether; in this manner, 76 grams (81% of the theory) of N-isopropyl-N′-[2-(α-hydroxyethyl)]-phenyl-thiourea melting at 98–100° C. are obtained.

(b) 30 grams of the thiourea obtained according to (a) are heated with hydrobromic acid as described in Example 28. The reaction mixture which is then rendered alkaline by means of dilute sodium hydroxide solution is then extracted with methylene chloride. After washing, drying and evaporating of the methylene chloride solution, there remains behind 2-isopropylamino-4-methyl-4H-3,1-benzothiazine in the form of a yellowish oil. By dissolution and crystallization from a mixture of ethanol and water there are obtained 19.5 grams (7% of the theory) of colorless crystals melting at 78–80° C.

EXAMPLE 31

2-ethylamino-4-phenyl-6-chloro-4H-3,1-benzothiazine (a) Preparation of the starting material:
27.5 grams of 2-amino-4-phenyl-6-chloro-4H-3,1-benzothiazine are dissolved in 150 milliliters of acetanhydride. The crystalline precipitate which separates soon with spontaneous evolution of heat is filtered off with suction after some hours and washed with ether. By recrystallization from a mixture of ethyl acetate and petroleum ether there are obtained 25.6 grams (81% of the theory) of 2-acetylamino-4-phenyl-6-chloro-4H-3,1-benzothiazine in the form of colorless crystals melting at 229–230° C.

(b) 8.5 milliliters of acetyl chloride are added dropwise while stirring and cooling with ice, to 27.5 grams of 2-amino-4-phenyl-6-chloro-4H-3,1-benzothiazine in 100 milliliters of pyridine. The whole is stirred for 30 minutes at 0° C. and for 30 minutes at room temperature and the acetyl compound is precipitated by dilution with water; it is filtered off with suction, washed with water, dried and recrystallized from a mixture of ethyl acetate and petroleum ether. The yield is 29.2 grams (92% of the theory) of 2-acetylamino-4-phenyl-6-chloro-4H-3,1-benzothiazine melting at 228–229° C.

(c) 4.2 grams of triethylamine and thereafter 4.4 grams of chloroformic acid ethyl ester are slowly added, while stirring and cooling with ice, to a solution of 2.4 grams of glacial acetic acid in 20 milliliters of acetone. After 30 minutes, a solution of 11.0 grams of 2-amino-4-phenyl-6-chloro-benzothiazine in 80 milliliters of acetone is added dropwise, likewise while cooling with ice, and the whole is stirred for 1 hour at 0° C. and 2 hours at room temperature. The crystalline residue which remains behind after evaporation of the solvent under reduced pressure is extracted several times with water and, after drying, recrystallized from a mixture of ethyl acetate and petroleum ether. 9.5 grams (75% of the theory) of 2-acetylamino - 4 - phenyl - 6-chloro-4H-3,1-benzothiazine melting at 228–229° C. are obtained.

(d) Reduction:
31.7 grams of the compound obtained according to (a)–(c) are reduced with 4.0 grams of lithium aluminum hydride in 500 milliliters of absolute ether. After 2 hours boiling with stirring and under reflux, decomposition is cautiously effected with water and the aluminum hydroxide which has precipitated is filtered off. The filtrate is washed with water, dried over sodium sulfate and evaporated. After recrystallization of the residue from a mixture of benzene and petroleum ether, 25.0 grams (83% of the theory) of 2-ethylamino-4-phenyl-6-chloro-4H-3,1-benzothiazine are obtained in the form of colorless crystals which melt at 118–120° C.

EXAMPLE 32

2-ethylamino-4-phenyl-5-chloro-4H-3,1-benzothiazine (a) Preparation of the starting material:
150 milliliters of acetanhydride are poured over 27.5 grams of 2-amino-4-phenyl-5-chloro-4H-3,1-benzothiazine and caused to dissolve by cautious heating on the steam bath. The reaction mixture is allowed to stand over night at room temperature and the crystalline precipitate is filtered off with suction. By recrystallization from benzene, there are obtained 29.0 grams (92% of the theory) of 2-acetylamino-4-phenyl-5-chloro-4H-3,1-benzothiazine in the form of colorless crystals which melt at 197–198° C.

(b) Reduction:
25.4 grams of the compound obtained according to (a) are reduced with 6.0 grams of lithium aluminum hydride in a mixture of 300 milliliters of absolute ether and 150 milliliters of absolute benzene. After 4 hours boiling under reflux, the mixture is worked up as described in Example 31 (d). After recrystallization from a mixture of benzene and petroleum ether there are obtained 18.5 grams of 2-ethylamino-4-phenyl-5-chloro-4H-3,1-benzothiazine melting at 108–110° C.

EXAMPLE 33

2-benzylamino-4-phenyl-6-chloro-4H-3,1-benzothiazine (a) Preparation of the starting material:
27.5 grams of 2-amino-4-phenyl-6-chloro-4H-3,1-benzothiazine are reacted with 13.5 milliliters of benzoyl chloride in the manner described in Example 31(b), whereby 30.0 grams (79% of the theory) of 2-benzoylamino-4-phenyl-6-chloro-4H-3,1-benzothiazine in the form of colorless crystals melting at 184–186° C. (from a mixture of ethyl acetate and petroleum ether) are obtained.

(b) Reduction:
19.0 grams of the compound obtained according to (a) are reduced with 3.0 grams of lithium aluminium hydride in 500 milliliters of absolute ether by 3 hours heating under reflux. After working up in a manner analogous to that described in Example 31(d) and recrystallization of the crude product from petroleum ether there are obtained 13.0 grams (70% of the theory) of 2-benzylamino-4-phenyl-6-chloro-4H-3,1-benzothiazine in the form of colorless crystals melting at 107–109° C.

EXAMPLE 34

2-(3'-piperidinopropyl)-amino-4-phenyl-6-chloro-4H-3,1-benzothiazine (a) Preparation of the starting material:
27 grams of dicyclohexyl - carbodiimide in 100 milliliters of tetrahydrofurane are added dropwise, while stirring, to a solution of 27.5 grams of 2-amine-4-phenyl-6-chloro-4H-3,1-benzothiazine and 14 grams of β-chloropropionic acid in 200 milliliters of tetrahydrofurane. Stirring of the reaction mixture is continued over night at room temperature and the precipitated dicyclohexyl-urea is removed by filtration with suction. After evaporation of the filtrate under reduced pressure, the residue is recrystallized from a mixture of benzene and petroleum ether, whereby 26.5 grams of 2 - (β - chloropropionyl)-amino - 4 - phenyl-6-chloro-4H-3,1-benzothiazine are obtained in the form of colorless crystals melting at 147–149° C.

(b) Reaction with piperidine:
22 grams of the compound obtained according to (a) are boiled for 8 hours under reflux, while stirring, with 12 grams of piperidine in 350 milliliters of absolute toluene. After cooling, the toluene solution is washed with water and dried over sodium sulfate. After removal of the solvent at 60° C. under reduced pressure, there remain behind 24 grams of 2 - (3' - piperidinopropionyl)-amino - 4 - phenyl - 6 - chloro-4H-3,1-benzothiazine in the form of a light yellow oil, the oxalate of which melts at 188–189° C.

(c) Reduction:
A solution of 21 grams of the compound obtained according to (b) in 175 milliliters of absolute benzene is added dropwise, while stirring and cooling with ice, to a suspension of 3.5 grams of lithium aluminium hydride in 175 milliliters of absolute ether. After having heated the reaction mixture for 2 hours under reflux, it is worked up as described in Example 31(d), whereby 17.5 grams (87% of the theory) of 2-(3'-piperidinopropyl)-amino-4-phenyl-6-chloro-4H-3,1-benzothiazine are obtained in the form of an almost colorless oil, the oxalate of which melts at 210–211° C.

EXAMPLE 35

2-ethylamino-4-methyl-4H-3,1-benzoxazine (a) 13.7 grams of α-methyl-2-aminobenzyl alcohol are heated for 10 minutes to 90–100° C. together with 13.0 grams of ethylisothiocyanate. The reaction mixture which crystallizes slowly upon cooling is triturated with petroleum ether and the crystalline precipitate is isolated by filtration with suction. By recrystallization from benzene there are obtained 20.6 grams (92% of the theory) of N-ethyl-N'-[2-(α-hydroxyethyl)]-phenyl - thiourea in the form of colorless crystals melting at 108–110° C.

(b) 22.4 grams of the thiourea obtained according to (a) are boiled for 30 minutes under reflux, while stirring, with 40 grams of mercury oxide. The reaction mixture is filtered hot and the solvent is evaporated under reduced pressure. 2 - ethylamino-4-methyl-4H-3,1-benzoxazine remains behind in the form of a colorless oil which crystallizes soon. After recrystallization from petroleum ether, there are obtained 16.5 grams (87% of the theory) of colorless crystals melting at 66–68° C.

EXAMPLE 36

2-cyclohexylamino-4-methyl-4H-3,1-benzoxazine 27.8 grams of the N-cyclohexyl-N'-[2 - (α - hydroxyethyl)]-phenyl-thiourea (melting point 143–145° C. from a mixture of ethyl acetate and petroleum ether) obtained by the reaction of α-methyl-2-amino-benzyl alcohol with cyclohexyl-isothiocyanate in a yield of 83% in a manner analogous to that described in Example 35(a), are treated as described in Example 35(b) with mercury oxide. After recrystallization of the crude product from petroleum ether, there are obtained 18.5 grams (76% of the theory) of 2-cyclohexylamino-4-methyl-4H-3,1-benzoxazine in the form of colorless needles melting at 107–109° C.

EXAMPLE 37

2-ethylamino-4-phenyl-4H-3,1-benzoxazine (a) 35 grams of ethyl-isothiocyanate are added to a solution of 40 grams of 2-aminobenzhydrol in 500 milliliters of ether and allowed to stand for 48 hours at room temperature. Two-thirds of the solvent are removed by distillation under reduced pressure and the crystalline precipitate is isolated by filtration with suction. In this manner, 51 grams of pure N-ethyl-N'-[2-(α-hydroxybenzyl)]-phenyl thiourea melting at 119–121° C. are obtained.

(b) 28.6 grams of the thiourea obtained according to (a) are heated for 1 hour under reflux, while stirring, with 40 grams of mercury oxide. After working up of the reaction mixture according to the method described in Example 35(b), 2-ethylamino-4-phenyl-4H-3,1-benzoxazine is obtained in the form of a light yellow oil which crystallizes after some time. For further purification, the compound is chromatographed on neutral aluminium oxide, activity II, with a mixture of benzene and petroleum ether in the ratio of 1:1 as well as with benzene as the eluting agents, whereby 17.5 grams (69% of the theory) of colorless crystals melting at 76–78° C. (from hexane) are obtained.

EXAMPLE 38

2-ethylamino-4-phenyl-6-bromo-4H-3,1-benzoxazine (a) By the reaction of 28 grams of 5-bromo-2-aminobenzhydrol with 17 grams of ethyl-isothiocyanate is 200 milliliters of ether in a manner analogous to that described in Example 37(a), there are obtained 29 grams (79% of the theory) of N-ethyl-N'-[4-bromo-2-(α-hydroxybenzyl)]-phenylthiourea melting at 148–150° C.

(b) 18 grams of the thiourea obtained according to (a) are heated under reflux, for 30 minutes, while stirring, with 22 grams of mercury oxide in 250 milliliters of ethanol. After working up according to the method described in Example 35 (b), there are obtained 13.5 grams (82% of the theory) of 2-ethyl-amino-4-phenyl-6-bromo-4H-3,1-benzoxazine melting at 128–129° C. from a mixture of benzene and petroleum ether).

EXAMPLE 39

2-methylamino-4-phenyl-6-chloro-4H-3,1-benzoxazine

In a manner analogous to that described in Example 38(b), there are obtained from 31 grams of N-methyl-N'-[4-chloro-2-(α-hydroxybenzyl)]-phenyl-thiourea prepared according to the method described in Example 5(a), 21 grams (77% of the theory) of 2-methylamino-4-phenyl-6-chloro-4H-3,1-benzoxazine melting at 149–150° C. (from a mixture of benzene and petroleum ether).

EXAMPLE 40

2-ethylamino-4-phenyl-6-chloro-4H-3,1-benzoxazine (a) 32 grams of the N-ethyl-N'-[4-chloro-2-(α-hydroxybenzyl)]-phenyl-thiourea prepared according to Example 6(a) are reacted with 44 grams of mercury oxide according to the method described in Example 38(b), whereby 27 grams (94% of the theory) of 2-ethylamino-4-phenyl-6-chloro-4H-3,1-benzoxazine are obtained in the form of colorless crystals melting at 124–125° C.

(b) 18 grams of the thiourea mentioned under (a) are boiled for 45 minutes under reflux, while stirring, with 250 milliliters of ethanol. The reaction solution is filtered hot and the solvent is evaporated under reduced pressure. By several extractions of the oily residue with hot petroleum ether, 11 grams (77% of the theory) of 2-ethylamino-4-phenyl-6-chloro-4H-3,1-benzoxazine melting at 124–125° C. are recovered.

EXAMPLE 41

2-amino-4-phenyl-6-chloro-4H-3,1-benzoxazine (a) 30 grams of potassium cyanate are introduced portion-wise, in the course of about 15 minutes, into a solution of 70.2 grams of 5-chloro-2-aminobenzhydrol in 300 milliliters of glacial acetic acid, while stirring and cooling. After a further 10 minutes, the reaction mixture is heated for 15 minutes on the steam bath and after it has cooled it is diluted with water. The N-[4-chloro-2-(α-hydroxybenzyl)]-phenyl-urea which has precipitated is filtered off with suction, washed with water, dried and recrystallized from a mixture of ethyl acetate and petroleum ether. 61.5 grams (74% of the theory) of colorless crystals melting at 157–159° C. are obtained.

(b) 14 grams of the urea prepared according to (a) are heated for 5–10 minutes, while stirring, with 50 milliliters of hydrobromic acid having a strength of 48% on the steam bath and then rapidly cooled. The reaction mixture is diluted with water, decanted, the semi-solid residue is taken up with methylene chloride and shaken with dilute sodium hydroxide solution. The methylene chloride solution is washed with water, dried over sodium sulfate and evaporated. The crude 2-amino-4-phenyl-6-chloro-4H-3,1 - benzoxazine which remains behind is then converted into the oxalate which crystallizes from a mixture of ethanol and ether in colorless crystals which melt at 167–168° C. Yield: 12 grams (69% of the theory). The free base can be obtained by shaking the oxalate with methylene chloride and dilute sodium hydroxide solution and concentrating the organic phase; after recrystallization from a mixture of benzene and petroleum ether, the base melts at 133–134° C.

EXAMPLE 42

2-ethylamino-4-phenyl-4H-3,1-benzoxazine (a) 7.1 grams of freshly distilled ethyl-isocyanate in 30 milliliters of chloroform are introduced dropwise, while stirring and cooling with ice, in the course of 30 minutes, into a solution of 20 grams of 2-amino-benzhydrol in 200 milliliters of chloroform. Stirring is then continued for 30 minutes at room temperature and the solvent is then removed under reduced pressure. The brownish oil which remains behind is taken up in hot benzene and the benzene solution is cautiously combined with petroleum ether. Upon cooling, 19 grams (70% of the theory) of N-ethyl-N'-[2(α-hydroxybenzyl)]-phenyl-urea melting at 132–134° C. crystallize.

(b) 17.5 grams of p-toluenesulfonic acid are added to a suspension of 13.5 grams of the urea prepared according to (a) in 100 milliliters of ethanol, while stirring, and then the whole is boiled for 45 minutes under reflux. After cooling, the reaction mixture is rendered alkaline by means of sodium hydroxide solution, diluted with water and extracted with ether. From the ether solution which has been washed with water and dried over sodium sulfate, there is obtained, after evaporation of the solvent, 2 - ethylamino-4-phenyl-4H-3,1-benzoxazine in the form of a yellowish oil. By dissolving it and allowing it to crystallize from hexane, 7.2 grams (57% of the theory)

of colorless crystals melting at 76–78° C. are obtained, which show no melting point depression with the compound prepared according to the method described in Example 37(b).

EXAMPLE 43

2-ethylamino-4-phenyl-6-chloro-4H-3,1-benzoxazine (a) 13 grams of 2 - amino-4-phenyl-6-chloro-4H-3,1-benzoxazine are introduced, while stirring, at room temperature, into 100 milliliters of acetanhydride. After solution in the beginning the acetyl compound soon separates as a crystalline precipitate. The whole is cooled for 1–2 hours in ice, filtered with suction and the precipitate is washed with a small amount of ether. 11 grams (73% of the theory) of pure 2-acetylamino-4-phenyl-6-chloro-4H-3,1-benzoxazine melting at 147–148° C. can be recovered in this manner.

(b) 9 milliliters of acetyl chloride are added slowly and dropwise, while stirring and cooling with ice, to a solution of 26 grams of 2-amino-4-phenyl-6-chloro-4H-3,1-benzoxazine in 200 milliliters of pyridine. The reaction mixture is stirred for 30 minutes at 0° C. and for 30 minutes at room temperature; the reaction mixture is then poured into about 2 liters of water. As soon as the precipitate solidifies, which is somewhat resinous at the beginning, it is isolated by filtration with suction, washed with water and dried. By recrystallization from ethanol, there are obtained 25.5 grams (85% of the theory) of 2-acetylamino-4-phenyl-6-chloro - 4H - 3,1 - benzoxazine melting at 147–148° C.

(c) 15 grams of the compound obtained according to (a) or (b) are reduced with 2 grams of lithium aluminium hydride in 300 milliliters of absolute ether. After boiling for 1½ hours with stirring and under reflux, the reaction mixture is cautiously decomposed with water and the aluminium hydride that has separated is filtered off. The filtrate is washed with water, dried over sodium sulfate and evaporated. After recrystallization from a mixture of benzene and petroleum ether, there are obtained 11 grams (76% of the theory) of 2-ethylamino-4-phenyl-6-chloro-4H-3,1-benzoxazine in the form of colorless crystals melting at 122–124° C.; the compound shows no melting point depression with the compound prepared according to the method described in Example 40.

EXAMPLE 44

2-amino-4-phenyl-6-chloro-4H-3,1-benzoxazine 11.7 grams of 2-amino-5-chlorobenzhydrol and 4 grams of anhydrous sodium acetate in 180 milliliters of methanol are introduced slowly and dropwise, while stirring and cooling with ice, into a solution of 5.2 grams of bromo cyanide in 180 milliliters of methanol. The reaction mixture is allowed to stand over night at room temperature, the solvent is removed under reduced pressure and the residue is extracted with ether. The ether solution which has been washed with water and dried over sodium sulfate yields upon evaporation a brown oil from which, with the aid of oxalic acid in acetone, 5.1 grams of 2-amino-4-phenyl-6-chloro-4H-3,1-benzoxazine in the form of the oxalate can be recovered. The substance melts at 167–168° C. with decomposition (after recrystallization from a mixture of ethanol and ether) and is identical with the compound described in Example 41.

EXAMPLE 45

2-isobutylamino-4-phenyl-6-chloro-4H-3,1-benzoxazine 16.6 grams of N-isobutyl-N′-[4-chloro-2-($\alpha$ - hydroxybenzyl)]-phenyl-urea (melting point 152–154° C. (from a mixture of benzene and petroleum ether), prepared by the reaction of 2-amino-5-chlorobenzhydrol with isobutylisocyanate in ether in a manner analogous to that in Example 42(a)), are heated with hydrobromic acid according to the method described in Example 41(b). After corresponding working up, there are obtained 14.3 grams (91% of the theory) of 2-isobutylamino-4-phenyl-6-chloro-4H-3,1-benzoxazine in the form of colorless crystals which melt at 117–118° C. (from petroleum ether).

EXAMPLE 46

24 grams of the 2-($\omega$-ethyl-thioureido) - 5,4′-dichlorobenzhydrol described in Example 17 are treated with mercury oxide according to the method described in Example 35(b). After recrystallization of the crude product from a mixture of benzene and petroleum ether, there are obtained 12.5 grams (60% of the theory) of 2-ethylamino-4-(p-chlorophenyl)-6-chloro-4H-3,1-benzoxazine melting at 144–145° C.

In analogous manner, desulfurization of 17.5 grams of 2-($\omega$-ethyl-thioureido)-5-chloro - 4′ - methoxybenzhydrol (from Example 15) yields 9.4 grams (59% of the theory) of 2-ethyl-amino-4-(p-methoxy-phenyl)-6-chloro-4H-3,1-benzoxazine melting at 106–108° C. (from petroleum ether).

EXAMPLE 47

15 grams of N-ethyl-N′ - [4 - chloro - 2 - ($\alpha$ - hydroxybenzyl)]-phenyl-urea (melting point 130–132° C., prepared according to Example 45) are heated for 5–10 minutes, while stirring, on the steam bath with 50 milliliters of hydrobromic acid having a strength of 48% and then rapidly cooled. After working up according to Example 41(b), there are obtained 12.5 grams (88% of the theory) of 2-ethylamino-4-phenyl-6-chloro-4H - 3,1 - benzoxazine melting at 124–125° C.

EXAMPLE 48

2-ethylamino-4-phenyl-6-trifluoromethyl-4H-3,1-benzothiazine (a) 13 grams of 2-amino-5-trifluoromethyl-benzhydrol (melting point 86–88° C., prepared by the reduction of 2-amino - 5 - trifluoromethyl - benzophenone with sodium boron hydride) are heated for 10 minutes on the steam bath with 6 grams of ethylisothiocyanate and then rapidly cooled. After having allowed the whole to stand over night, the crystal magma that has formed is digested with a small amount of benzene and filtered off with suction. In this manner 13.5 grams of N-ethyl-N′-[4-trifluoromethyl - 2 - ($\alpha$ - hydroxybenzyl)]-phenyl-thiourea are obtained in the form of colorless crystals which, after recrystallization from benzene, melt at 166–168° C.

(b) 9 grams of the thiourea obtained according to (a) are shortly heated with hydrobromic acid analogously to the method described in Example 18(b), whereby 7 grams (82% of the theory) of 2-ethylamino-4-phenyl-6-trifluoromethyl-4H-3,1-benzothiazine are obtained in the form of colorless crystals which melt at 84–85° C. (from petroleum ether).

EXAMPLE 49

2-ethylamino-4-phenyl-6-methoxy-4H-3,1-benzothiazine (a) 6.6 grams of 2 - amino - 5 - methoxy-benzhydrol (melting point 95.5–96° C., prepared by the reduction of 2-amino-5-methoxy-benzophenone with sodium boron hydride) are heated for 5 minutes on the steam bath with 3.2 grams of ethyl-isothiocyanate. The resinous reaction product is dissolved hot in 75 milliliters of benzene. Upon slow cooling, crystallization takes place which can be completed by the addition of petroleum ether. In this manner 7.8 grams of N-ethyl-N′-[4-methoxy - 2 - ($\alpha$-hydroxybenzyl)-phenyl]-thiourea melting at 133–134° C. are obtained.

(b) 7.8 grams of the thiourea obtained according to (a) are boiled under reflux for 30 minutes, while stirring, with 50 milliliters of concentrated hydrochloric acid. After cooling, the mixture is diluted with water, rendered alkaline by means of a sodium hydroxide solution while cooling with ice and the oily reaction product is taken up in methylene chloride. The methylene chloride solution is washed with water, dried over sodium sulfate and the solvent is removed. The residue is dissolved hot in 60 milliliters of cyclohexane. Upon cooling, there are obtained 6.8 grams (92.5% of the theory) of 2-ethyl-amino-4-phenyl-6-methoxy-4H-3,1-benzothiazine in the form of colorless needles melting at 91–92.5° C.

We claim:
1. Compound of the formula

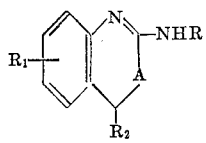

in which A is oxygen or sulfur; R is hydrogen, alkyl of 1 to 6 carbon atoms. cyclohexyl, lower alkenyl, cycloalkenyl of five to six carbon atoms, phenyl, benzyl, dilower alkyl-amino-lower alkyl, piperidino-lower alkylene, morpholino-lower alkylene, pyrrolidino-lower alkylene, N-lower alkyl-piperazino-lower alkylene or N-benzyl-piperazino-lower alkylene; $R_1$ is hydrogen, halogen, methoxy, trifluoromethyl or nitro; $R_2$ is lower alkyl, benzyl, unsubstituted aryl of 6 to 10 carbon atoms, or phenyl substituted by halogen, methoxy, trifluoromethyl or nitro, or an acid addition salt of said compound with a physiologically compatible organic or inorganic acid.

2. A compound as defined in claim 1 wherein A represents sulfur.
3. A compound as defined in claim 1 wherein A represents oxygen.
4. A compound as defined in claim 1 wherein R is an alkyl of 1 to 3 carbon atoms.
5. A compound as defined in claim 1 wherein R is ethyl.
6. A compound as defined in claim 1 wherein $R_1$ is chlorine.
7. A compound as defined in claim 1 wherein $R_1$ is hydrogen.
8. A compound as defined in claim 1 wherein $R_2$ is phenyl.
9. A compound as defined in claim 1 wherein $R_2$ is methyl.
10. Compound as claimed in claim 1 in which R means diethyl-amino alkyl in which the alkyl group contains 2–3 carbon atoms.
11. Compound as claimed in claim 1 in which $R_1$ means 6-nitro.
12. 2 - ethylamino - 4 - phenyl - 6 - chloro - 4H - 3,1-benzothiazine.
13. 2 - ethylamino - 4 - phenyl - 6 - chloro - 4H - 3,1-benzoxazine.
14. 2-ethylamino-4-methyl-4H-3,1-benzothiazine.

References Cited

UNITED STATES PATENTS 3,168,517  2/1965  Behner et al. _____ 260—243

OTHER REFERENCES

Sharma et al.: J. Org. Chem., vol. 28, pp. 740–2 (1963).

HENRY R. JILES, *Primary Examiner.*

J. M. FORD, *Assistant Examiner.*

U.S. Cl. X.R.

167—65; 260—2, 44, 552, 553, 575, 578